US007201430B2

(12) United States Patent
Sakai et al.

(10) Patent No.: US 7,201,430 B2
(45) Date of Patent: Apr. 10, 2007

(54) DRIVING DEVICE FOR DRIVING AN OPEN/CLOSE MEMBER

(75) Inventors: Toshiyuki Sakai, Kariya (JP); Hiroji Ikeda, Nagoya (JP); Takeshi Yamamoto, Takahama (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/138,283

(22) Filed: May 27, 2005

(65) Prior Publication Data

US 2005/0275237 A1 Dec. 15, 2005

(30) Foreign Application Priority Data

May 27, 2004 (JP) ............................. 2004-157178
May 27, 2004 (JP) ............................. 2004-157179

(51) Int. Cl.
*B60J 5/00* (2006.01)

(52) U.S. Cl. .................. 296/146.8; 74/411; 74/412 TA

(58) Field of Classification Search .................. 296/56, 296/146.1, 146.4, 146.8; 49/341, 340, 339; 74/412 TA, 411
See application file for complete search history.

(56) References Cited

U.S. PATENT DOCUMENTS

| | | | | | |
|---|---|---|---|---|---|
| 3,422,572 | A | * | 1/1969 | Pollak | 49/340 |
| 4,702,122 | A | * | 10/1987 | Richard | 74/412 TA |
| 5,896,703 | A | * | 4/1999 | Wright et al. | 49/340 |
| RE36,267 | E | * | 8/1999 | Moore et al. | 49/340 |
| 6,318,025 | B1 | * | 11/2001 | Sedlak | 49/341 |
| 6,508,140 | B2 | * | 1/2003 | Zaps | 74/411 |
| 6,719,356 | B2 | * | 4/2004 | Cleland et al. | 296/146.8 |
| 6,964,449 | B2 | * | 11/2005 | Takeda et al. | 296/146.8 |
| 2002/0032986 | A1 | * | 3/2002 | Yuge | 49/341 |
| 2004/0046418 | A1 | * | 3/2004 | Chikata et al. | 296/146.4 |
| 2006/0006692 | A1 | * | 1/2006 | Takahashi et al. | 296/146.4 |

FOREIGN PATENT DOCUMENTS

| | | |
|---|---|---|
| JP | 2003-312268 | 11/2003 |

* cited by examiner

*Primary Examiner*—Jason Morrow
(74) *Attorney, Agent, or Firm*—Finnegan, Henderson, Farabow, Garrett & Dunner, LLP

(57) ABSTRACT

A driving device for driving an open/close member that is designed to open and close an open portion of a body includes a driving source generating a driving force, a force transmission mechanism disposed between the driving source and the open/close member and serving for transmitting the driving force thereto, and a load regulator for interrupting the driving force transmission when an excessive force is applied to the force transmission mechanism from the open/close member.

5 Claims, 7 Drawing Sheets

DRIVING DEVICE FOR DRIVING AN OPEN/CLOSE MEMBER

CROSS REFERENCE TO RELATED APPLICATIONS

This application is based on and claims priority under 35 U.S.C. § 119 to Japanese Patent Application 2004-157178 and 2004-157179, filed on May 27, 2004, the entire contents of which are incorporated herein by reference.

FIELD OF THE INVENTION

The present invention generally relates to a driving device for driving an open/close member that is designed to open and close an opening portion of a body, especially a vehicle body.

BACKGROUND

A known driving device for driving an open/close member is disclosed in 2003-312268A (especially in Page 3 and in FIG. 2 and FIG. 3). A configuration and a structure of the driving device will be explained with reference to FIG. 10 and FIG. 11. Specifically, FIG. 10 illustrates a structure of the driving device, and FIG. 11 illustrates an example in which the driving device is applied to an electrically operated lift-gate door unit of a vehicle.

In this example, a lift-gate 101 provided to an opening 100 of the vehicle is electrically operated to open and close by means of a driving force generated by a motor 102 of the driving device.

In the driving device, a clutch mechanism is provided between the motor 102 and a pinion gear 103. When the driving device is actuated, the driving force generated by the motor 102 is transmitted to the pinion gear 103 via the clutch mechanism.

The pinion gear 103 is engaged with a gear 105 formed on a side surface of a rack 104. An upper end of the rack 104 is connected to a lower end of the rod 106, and a top end of the rod 106 is connected to the lift-gate 101 so as to be rotatable. A slider 107 is provided between the rack 104 and the rod 106. The slider 107 is engaged with a guide groove 109 of the rail 108 so as to be slidable.

When electric power is supplied to the motor 102 in order to actuate the driving device, (driving device is in an actuating state), the driving force is transmitted to the pinion gear 103 via the clutch mechanism in order to rotate the pinion gear 103. And then the rack 104, being engaged with the pinion gear 103, slides in an upper direction along the guide groove 109 so as to be guided by the slider 107. In accordance with this movement of the rack 104, the rod 106 connected to the upper end of the rack 104, is pushed in an upper direction, and then the lift-gate 101 to which the rod 106 is connected is opened upwardly (opening operation of the lift-gate 101).

When the driving device is in an actuating state, because the pinion gear 103 is rotated by means of the driving force generated by the motor 102, and the rack 104 is engaged with the pinion gear 103, such driving force is consistently transmitted to the rack 104.

Thus, even when the opening operation of the lift-gate 101 is suddenly decelerated (or suddenly stopped) due to some reason, the driving force generated by the motor 102 is kept to be transmitted to the rack 104, and such driving force is kept to be applied to the rod 106, which is connected to the rack 104, in a direction where the lift-gate 101 is opened. However, because the movement of the lift-gate 101, which is operated so as to be opened, is suddenly decelerated (or suddenly stopped), the movements of the rod 106, which is connected to the lift-gate 101, and the rack 104, which is connected to the rod 106, are interrupted. Specifically, because the driving force transmitted to the rack 104 by means of the pinion gear 103 cannot escape from the rack 104, an excessive force is applied to these members (force transmission mechanism).

In consideration of such condition, the force transmission mechanism of the driving device needs to be reinforced so as to be durable against an excessive force. However, if the force transmission mechanism is reinforced, it becomes inevitable that the structure of the force transmission mechanism becomes more complicated or a weight of the force transmission mechanism is increased.

Thus, a need exist for modifying the driving device to interrupt the excessive force transmission.

SUMMARY OF THE INVENTION

In accordance with a first aspect of the present invention, a driving device for driving an open/close member that is designed to open and close an open portion of a body comprises a driving source generating a driving force, a force transmission mechanism disposed between the driving source and the open/close member and serving for transmitting the driving force thereto, and a load regulator for interrupting the driving force transmission when an excessive force is applied to the force transmission mechanism from the open/close member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments to implement the present invention will be explained in accordance with drawings attached hereto.

Figure 3:
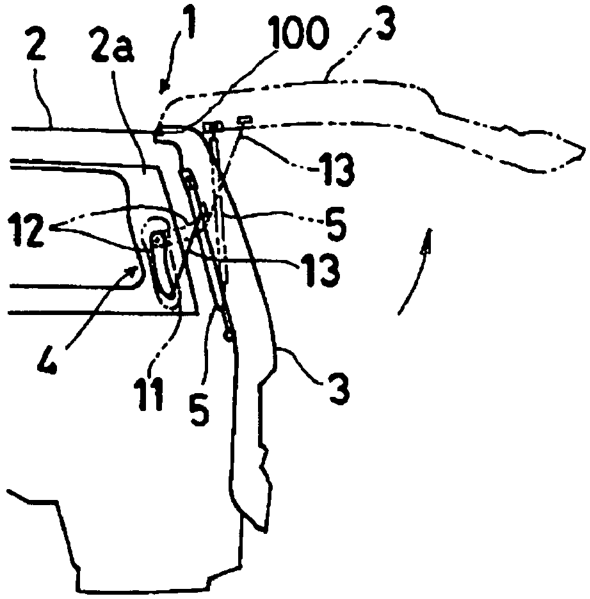
FIG. 3 illustrates a schematic view indicating an example in which the driving unit according to either of the first embodiment and the second embodiment of the present invention is applied to an electrically operated lift-gate door.

FIG. 3 illustrates a schematic view indicating a structure of an electrically operated lift-gate door unit 1 in which a driving device according to a first embodiment of the present invention is employed. As shown in FIG. 3, the electrically operated lift-gate door unit 1 includes a lift-gate door 3 (open/close member) connected by means of a hinge 100 to an upper-rear portion of a vehicle body 2, an actuator 4 for electrically opening/closing the lift-gate door 3 and a damper stay 5 serving as a cushion member. The lift-gate door 3 pivotally rotates about the horizontal hinge axis 100.

Specifically, the actuator 4 includes a driving unit 11 and a rod 13. More specifically, the driving unit 11 (driving device) is fixed to a rear pillar 2*a* of the vehicle body 2 for outputting a driving force via an arm 12, and the rod 13 is used for connecting a top end portion of the arm 12 to a base end portion of the lift-gate door 3. The rod 13 is rotatably connected to the top end portion of the arm 12 and to the base end portion of the lift-gate door 3.

A solid line in FIG. 3 illustrates a closed state of the lift-gate door 3. In the closed state, the arm 12 is folded relative to the rod 13 so that the top end portion the arm 12 faces a bottom of the vehicle (downward direction in FIG. 3). On the other hand, a chain double-dashed line in FIG. 3 illustrates an opened state of the lift-gate door 3. In the opened state, the arm 12 is extended relative to the rod 13 so that the top end portion of the arm 12 faces a rear of the vehicle (rightward direction in FIG. 3). Thus, when the driving unit 11 causes the arm 12 and the rod 13 to rotate into the folded and extended states thereof, the lift-gate door 3 is brought into its closed and opened conditions, respectively.

The damper stay 5 includes a gas piston into which high pressure gas is charged. One end of the damper stay 5 is connected to the rear portion of the vehicle body 2 and the other end of the damper stay 5 is connected to a base end of the lift-gate door 3.

In an earlier half stage of the opening operation of the lift-gate door 3, the damper stay 5 generates a resultant force in a closed direction in conjunction with a lift-gate door's own weight so as to prevent the lift-gate door 3 from opening rapidly.

In a later half stage of the opening operation of the lift-gate door 3, the damper stay 5 generates a resultant force in an opened direction in conjunction with a lift-gate door's own weight so as to assist the lift-gate door 3 to open. In other words, the damper stay 5 applies a force to the lift-gate door 3 on the basis of a balanced position at which the generated resultant force is balance out with the lift-gate's own weight. Specifically, so long as the lift-gate door 3 is in the course approaching the balanced position, the damper stay 5 applies the force to the lift-gate door 3 in a closing direction, while after the lift-gate door 3 passes through the balanced position, the damper stay 5 applies the force to the lift-gate door 3 in an opening direction.

Figure 1:
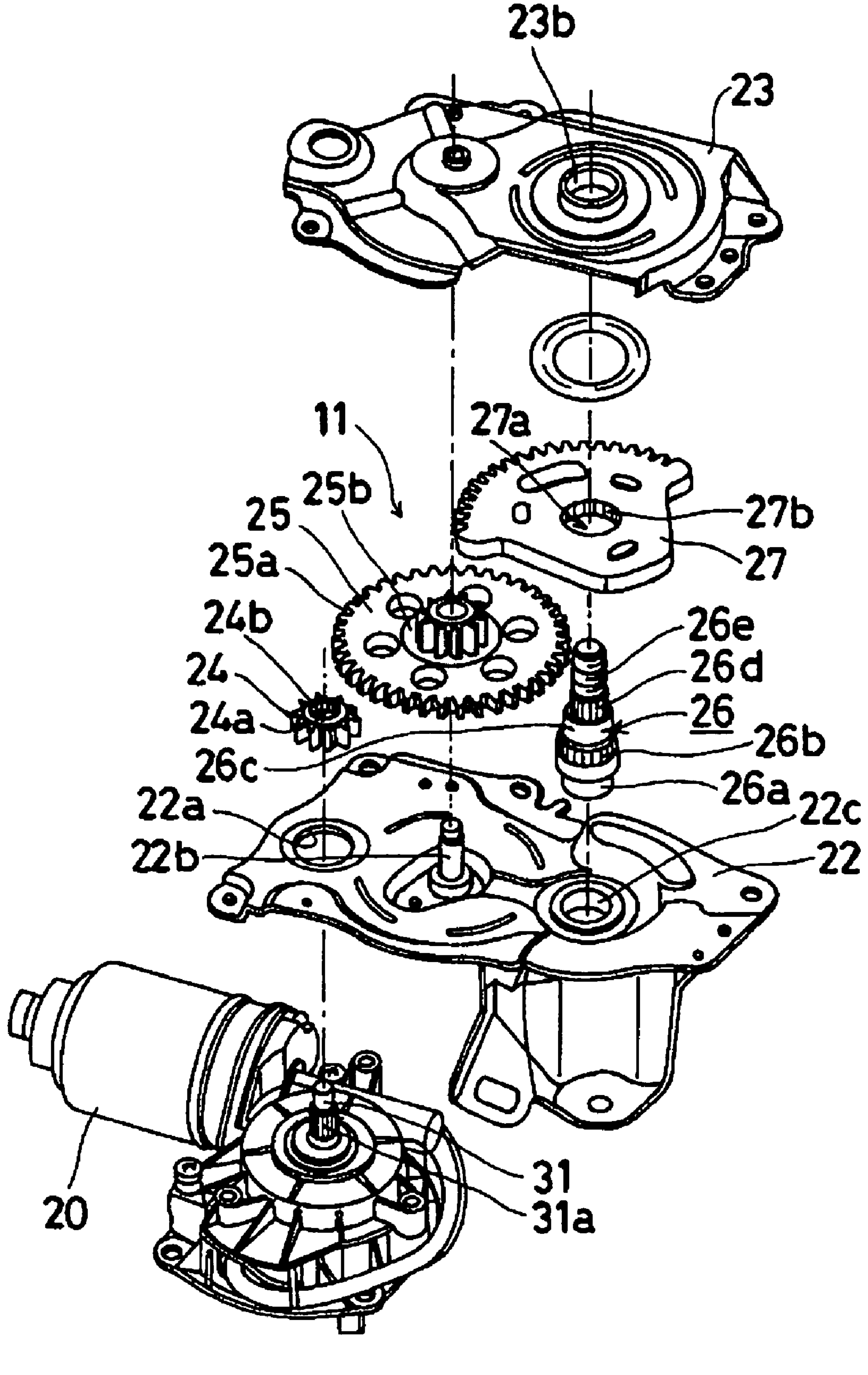
FIG. 1 illustrates an exploded perspective view of a basic structure that is commonly used in driving units according to first and second embodiments.
Figure 2:
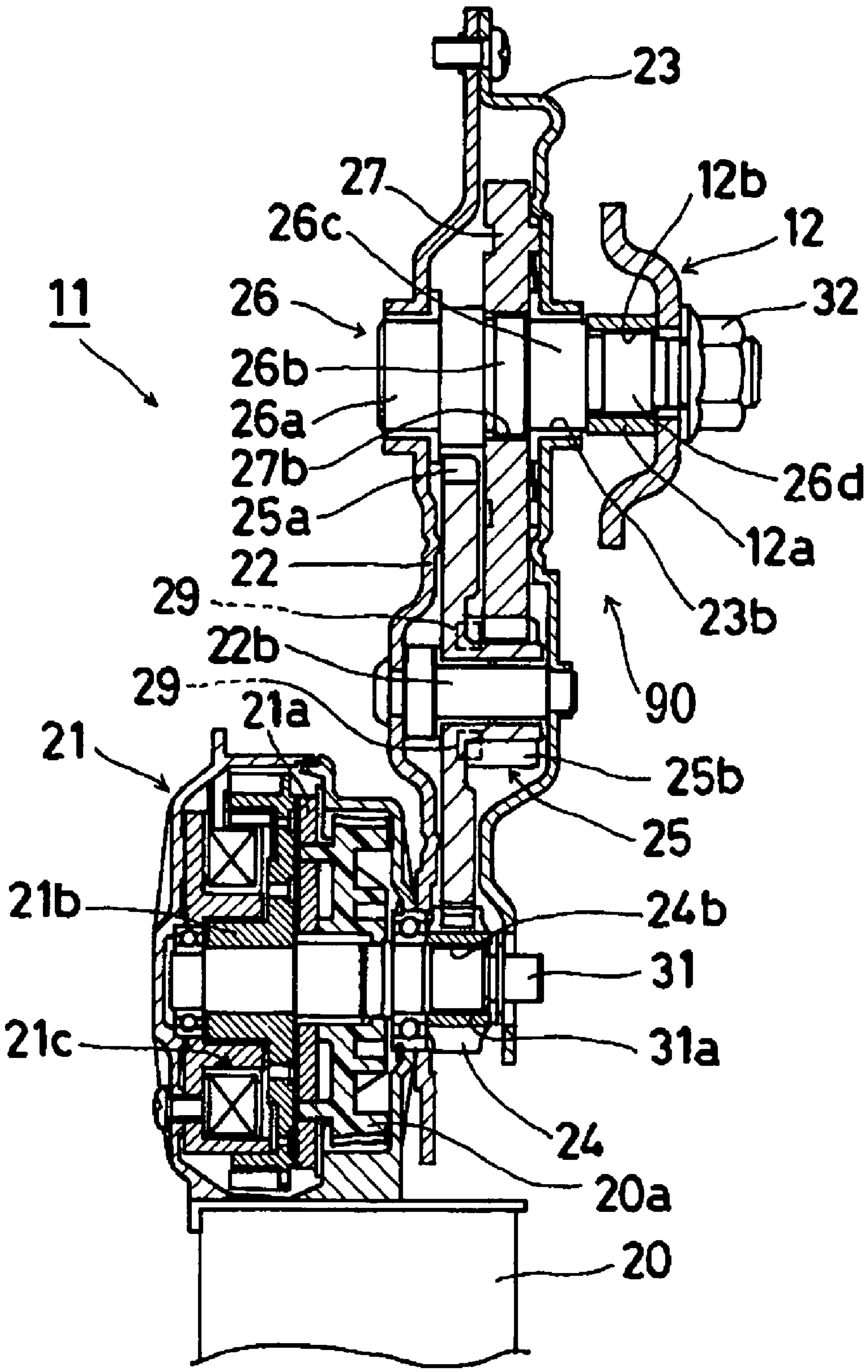
FIG. 2 illustrates a partial cross section of the driving unit of the first embodiment including the structure shown in FIG. 1.

The driving unit 11 according to the present invention will be explained in reference with FIG. 1 and FIG. 2. FIG. 1 illustrates an exploded perspective view, which indicates a structure of the driving unit 11. FIG. 2 illustrates a partial cross section, which indicates a part of the driving unit 11.

The driving unit 11 (open/close device) includes an electric motor 20 (driving source), a clutch mechanism 21, a pinion gear 24, an intermediate gear 25, an output shaft 26, a sector gear 27 and an arm 12. The clutch mechanism 21, the pinion gear 24, the intermediate gear 25, the output shaft 26, the sector gear 27 and the arm 12, in combination, act as functioned as a force transmission mechanism for transmitting a driving force from the electric motor 20 to the lift-gate door 3 (rod 13). Such parts that constitute the force transmission mechanism except for the clutch mechanism 21 comprise an intermediate mechanism 90. An upper case 23 and a lower case 22 support ratable the output shaft 26, and the output shaft 26 is fitted to the sector gear 27. The sector gear 27, the intermediate gear 25 which engages with the sector gear 27, and the pinion gear 24 that engages with the intermediate gear 25 are housed in a space between the upper case 23 and the lower case 22 that are in opposition.

The electric motor 20 (driving source) generates a driving force for actuating the lift-gate door 3 to open and close. The driving force generated by the electric motor 20 is transmitted to the clutch mechanism 21 via a set of worm (not shown) and worm wheel 20*a*.

As shown in FIG. 2, the clutch mechanism 21 is in the form of a known electromagnetic clutch that includes a plate 21*a*, a rotor 21*b*, a magnet coil 21*c*, and other elements. When an electric power is supplied to the magnet coil 21*c*, an attraction force is generated between the plate 21*a* and the rotor 21*b*, which establishes a frictional engagement therebetween (engaging state). In the engaging state, when the driving force generated of the electric motor 20 rotates the worm wheel 20*a*, the plate 21*a* connected to the worm wheel 20*a* is rotated in conjunction with the rotation of the worm wheel 20*a*. At this point, the frictional force generated between the plate 21*a* and the rotor 21*b* causes the rotor 21*b* to rotate together with the plate 21*a*. Further, the rotor 21*b* is so connected to the output shaft 31 as to rotate concurrently therewith. Specifically, when the driving unit 11 is actuated, the clutch mechanism 21 is made engaging state, whereby the driving force of the electric motor 20 is transmitted to the output shaft 31 via the clutch mechanism 21.

The pinion gear 24 is connected to the output shaft 31, which passes through a through hole 22*a* of the lower case 22, so as to be rotated therewith. In detail, a through hole 24*a*, which penetrates in an axial direction of the pinion gear 24, is formed on the pinion gear 24, and a serration 24*b*, which meshes with a serration 31*a* of the output shaft 31, is formed on an inner peripheral surface of the through hole 24*a*. Thus, in circumstances where the serration 24*a* of the pinion gear 24 is engaged with the serration 31*a* of the output shaft 31, the pinion gear 24 is rotated together with the output shaft 31.

A shaft portion 22*b* of the lower case 22 is inserted into the intermediate gear 25 (driving member) in order to rotatably support the intermediate gear 25. The intermediate gear 25 includes a first gear portion 25*a* whose diameter is larger than a diameter of the pinion gear 24, and a second gear portion 25*b* whose diameter is smaller than the diameter of the first gear portion 25*a*. The first gear portion 25*a* meshes with the pinion gear 24, which enables the the electric motor 20 to rotate the intermediate gear 25.

The output shaft 26 is formed into a stepped column-shape configuration. The output shaft 26 is rotatably supported by the lower case 22 in circumstances where a first shaft portion 26*a* formed on a base end side of the output shaft 26 is inserted into a bearing hole 22*c* formed on the lower case 22 so as to be rotatably supported by the lower case 22. Specifically, the output shaft 26 includes a first serration shaft portion 26*b*, a second shaft portion 26*c*, a second serration shaft portion 26*d* and a screw portion 26*e* in a sequential order, and a diameter of the second shaft portion 26*c* is smaller than a diameter of the first serration shaft portion 26*b*, and a diameter of the second serration shaft portion 26*d* is smaller than the diameter of the second shaft portion 26*c* and a diameter of the screw portion 26*e* is smaller than the diameter of the second serration shaft portion 26*d*, and thus, diameters of the output shaft 26 are gradually decreased toward a top end side thereof. The first serration shaft portion 26*b* is fitted into a through hole 27*a* of the sector gear 27, and the second serration shaft portion 26*d* is fitted into a sleeve 12*a* fixed to the arm 12.

The sector gear 27 is formed in a sector shape, and the output shaft 26 is fit into the through hole 27*a* of the sector gear 27 so that the sector gear 27 can rotate together with the output shaft 26. Specifically, the through hole 27*a* penetrating in an axial direction is formed on the sector gear 27, and on an inner peripheral surface of the through hole 27*a*, a serration 27*b* is formed. The serration 27*b* corresponds to the serration of the first serration shaft portion 26*b*. Thus, the sector gear 27 is rotated together with the output shaft 26 in circumstances where the serration 27*b* of the sector gear 27 is fitted to the serration of the first serration shaft portion 26*b*. Further, the sector gear 27 also meshes with the second gear portion 25*b* of the intermediate gear 25, and thus the sector gear 27 can be rotated along with the output shaft 26 by the intermediate gear 25.

As shown in FIG. 2, the arm 12 is connected to the second serration shaft portion 26*d* of the output shaft 26, which is inserted into a bearing hole 23*b* of the upper case 23 and extending rightward in FIG. 2, so as to be rotated together with the output shaft 26. Specifically, the sleeve 12*a* corresponding to the output shaft 26 (second serration shaft portion 26*d*) is fixed to a base end of the arm 12 so as to be extending in an axial direction. On an inner peripheral surface of the sleeve 12*a*, a serration 12*b* is formed so as to correspond to the serration of the second serration shaft portion 26*d*. Thus, the serration 12*b* of the arm 12 meshes with the serration of the output shaft 26 (second serration shaft portion 26*d*) so that the arm 12 rotates together with the output shaft 26. Further, in circumstances where the output shaft 26 is inserted into a hole of the arm 12 so as to be extending in rightward in FIG. 2, a nut 32 is screwed to the screw portion 26*e*, which is formed on the top end of the output shaft 26.

Figure 4:
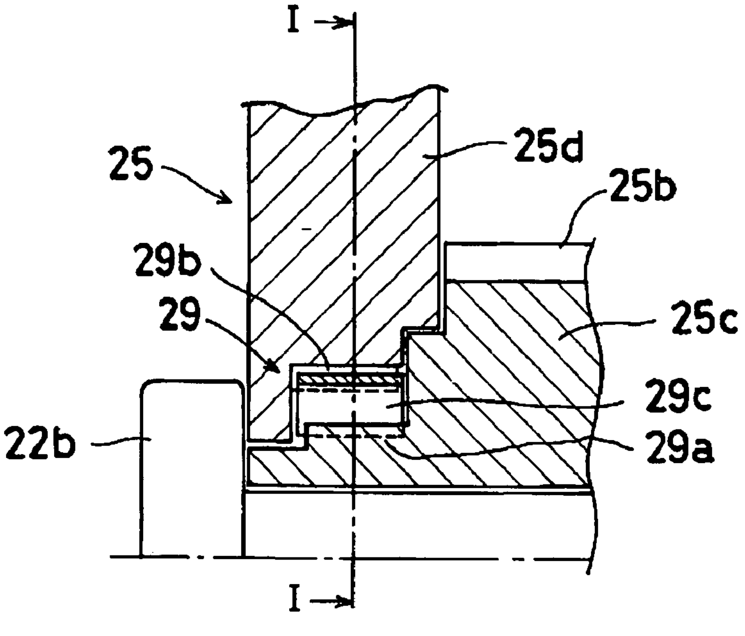
FIG. 4 illustrates an enlarged view of a part of a torque limiter mechanism provided in the driving unit shown in FIG. 2.
Figure 5A:
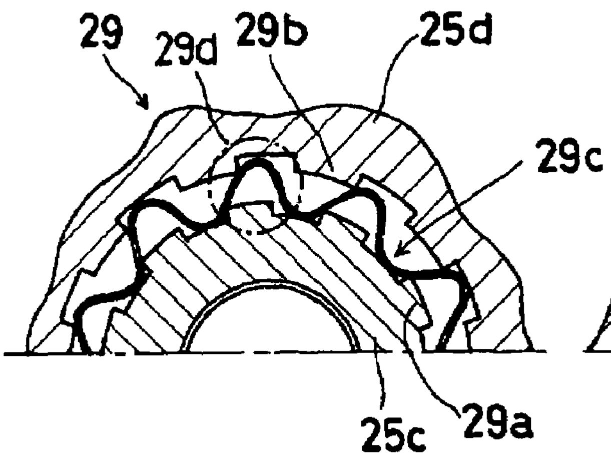
FIG. 5A illustrates a cross section of the torque limiter mechanism taken along line I—I in FIG. 4 when the torque limiter mechanism is not in active.

A torque limiter mechanism 29 is provided at the intermediate gear 25. A structure and a configuration of the torque limiter mechanism 29 will be explained in reference with FIG. 4 and FIG. 5A. FIG. 4 illustrates an enlarged view of a part of the torque limiter mechanism 29, and FIG. 5A illustrates a cross section of FIG. 4 along a I—I line.

The intermediate gear 25 includes a supporting member 25*c* (driven member), which has a second gear portion 25*b*, and a circular portion 25*d* (driving member), which has a first gear portion 25*a* (shown in FIG. 2). The supporting member 25*c* and the circular portion 25*d* are provided independently. A driving force generated by the electric motor 20 is applied to the circular portion 25*d*, which is having the first gear portion 25*a*, by means of the pinion gear 24 (shown in FIG. 2). The supporting member 25*c* is rotatably supported by the shaft portion 22*b* of the lower case 22 and inserted into the circular portion 25*d*. The torque limiter mechanism 29 is provided between the supporting member 25*c* and the circular portion 25*d* in a radial direction of the intermediate gear 25. As shown in FIG. 5, the torque limiter mechanism 29 is comprised of plural protruding portions 29*a* formed on the supporting member 25*c*, plural protruding portions 29*b* formed on the circular portion 25*d* and a leaf spring 29*c* (load regulator). The protruding portions 29*a* are formed on an outer peripheral surface of the supporting member 25*c* so as to protrude in a radial direction from the outer peripheral surface of the supporting member 25*c* and to be equally spaced in a peripheral direction of the supporting member 25*c*. The protruding portions 29*b* are formed so as to correspond to the protruding portions 29*a* of the supporting member 25*c*. More specifically, the protruding portions 29*b* are formed on an inner peripheral surface of the circular portion 25*d* so as to protrude in a radial direction from the inner peripheral surface of the circular portion 25*d* and to be equally spaced in a peripheral direction of the circular portion 25*d*. The leaf spring 29*c* is provided between the protruding portions 29*a* and the protruding portions 29*b*. The leaf spring 29*c* is made of a corrugated long elastic member such as a corrugated metal plate so as to be in a ring-shape. Specifically, the leaf spring 29*c* includes plural convex portions 29*d*, each of which protrudes in a radially outward direction. More specifically, the plural convex portions 29*d* are formed on the leaf spring 29*c* sequentially in a peripheral direction.

When the circular portion 25*d* is rotated by means of the generated driving force of by the electric motor 20, the protruding portions 29*b* of the circular portion 25*d* presses the convex portions 29*d* of the leaf spring 29*c* in a direction where the circular portion 25*d* rotates. Accordingly, the convex portions 29*d* of the leaf spring 29*c* presses the protruding portions 29*a* of the supporting member 25*c* in a direction where the circular portion 25*d* rotates, and thus the supporting member 25*c* rotates in a same direction as the rotation of the circular portion 25*d* rotates. Specifically, when the intermediate gear 25 is driven to be rotated, the circular portion 25*d* and the supporting member 25*c* can be concurrently rotated by means of the leaf spring 29, as a result, the driving force applied to the circular portion 25*d* transmits to the sector gear 27 (shown in FIG. 2) by means of the supporting member 25*c* having a second gear portion 25*b*. In this condition, the leaf spring 29 is engaged with the protruding portions 29*a* and 29*b* at the intermediate gear's rotational direction side of the convex portions 29*d*. Specifically, by means of the protruding portions 29*a* and 29*b*, a load corresponding to load applied to the supporting member 25*c* (a force applied to driving members which are positioned between the supporting member 25*c* and the lift-gate door 3) is input, as a result the convex portion 29*d* of the leaf spring 29 is elastically deformed so as to interrupt the concurrent rotation between the circular portion 25*d* and the supporting portion 25*c*.

In the above example, the torque limiter mechanism 29 including the leaf spring 29*c* is provided at the intermediate gear 25, however, the torque limiter mechanism 29 may be provided, for example, at the sector gear 27 (driving member) instead.

In addition, the torque limiter mechanism 29 may be provided between the output shaft 26 (driving member) and the arm 12 (driving member). In this case, the output shaft 26 functions as an input portion of the driving force, and the arm 12 functions as an output portion of the driving force.

Figure 6:
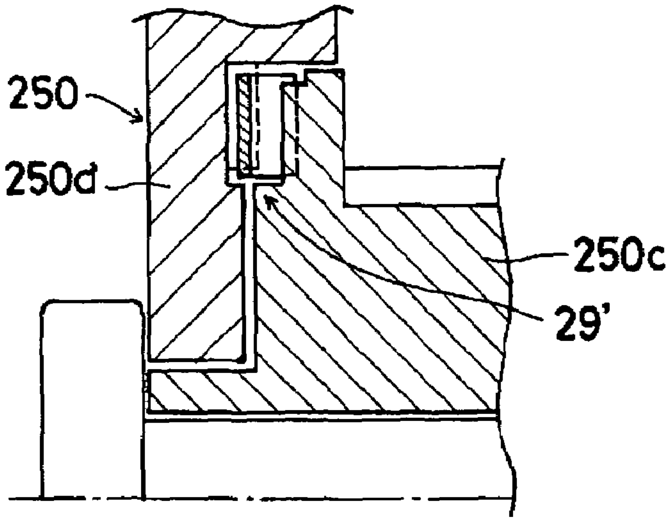
FIG. 6 illustrates a modified example of the torque limiter mechanism illustrated in FIG. 2.

In the above example, a driving force generated by the electric motor 20 is transmitted from the circular portion 25*d* to the supporting member 25*c* by means of the torque limiter mechanism 29 in a radial direction of the intermediate gear 25. However, such configuration may be changed, for example, as shown in FIG. 6. In this example, a driving force generated by the electric motor 20 is transmitted from a circular portion 250*d* to a supporting member 250*c* by means of a torque limiter mechanism 29' in an axial direction of an intermediate gear 250.

Figure 5B:
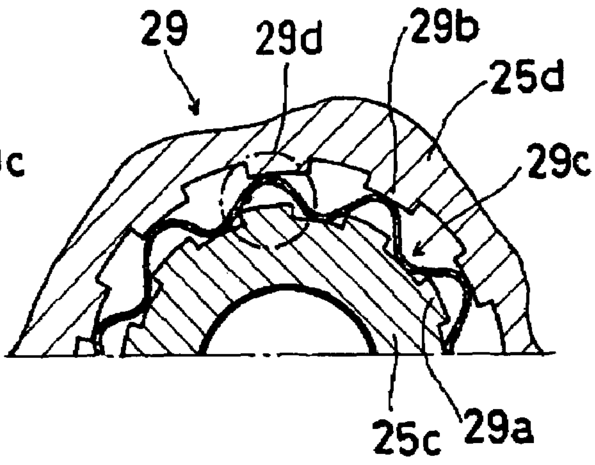
FIG. 5B illustrates a cross section of the torque limiter mechanism similar that is in active.

An actuation of the torque limiter mechanism 29 of the intermediate gear 25 when the lift-gate door 3 is opened will be explained with reference to FIG. 2, FIG. 3, FIG. 5A and FIG. 5B. FIG. 5A illustrates a condition of the torque limiter mechanism 29 when the lift-gate door 3 is normally opened, and FIG. 5B illustrates a condition of the torque limiter mechanism 29 when the opening operation of the lift-gate door 3 is rapidly decelerated.

When the lift-gate door 3 is in a closed state as shown in a solid line in FIG. 3, power is supplied to the electric motor 20 in order to actuate the driving unit 11. Specifically, a driving force is generated by the electric motor 20, and the generated driving force is transmitted to the output shaft 31 in order to rotate the output shaft 31. Such driving force is further transmitted to the arm 12 through the pinion gear 24, the intermediate gear 25 (the first gear portion 25*a* and the second gear portion 25*b*), the sector gear 27 and the output shaft 26, and further transmitted by means of the rod 13 to the lift-gate door 3. Finally, the lift-gate door 3 is actuated so as to be opened as shown in the chain double-dashed line in FIG. 3.

When the lift-gate door 3 is normally opened, because the movement of the lift-gate door 3 is not interrupted, a predetermined load (rated load) is applied to the driving unit 11, which is connected to the lift-gate door 3 by means of the rod 13. The predetermined load is calculated on the basis of a weight of the lift-gate door 3. In this circumstance, in the intermediate gear 25 of the driving unit 11, a driving force is transmitted from the circular portion 25*d* to the supporting member 25*c* by means of the leaf spring 29*c* of the torque limiter mechanism 29 as shown in FIG. 5A. Specifically, the driving force generated by the electric motor 20 is transmitted to the circular portion 25*d* by means of the first gear portion 25*a*, and then such driving force is further transmitted by means of the protruding portions 29*b* to the convex portion 29*d* of the leaf spring 29*c*. Then, the driving force is further transmitted to the supporting member 25*c* by means of the protruding portions 29*a*, and then further transmitted to the rod 13, which is connected to the lift-gate door 3 by means of the sector gear 27, the output shaft 26 and the arm 12. In this case, a load whose level is corresponding to the predetermined load (rated load) of the supporting member 25*c* is applied to the convex portion 29*d* of the leaf spring 29*c* by means of the protruding portions 29*a* and 29*b*, as a result, the convex portion 29*d* of the leaf spring 29*c* is elastically deformed so as to interrupt the integral rotation between the circular portion 25*d* and the supporting portion 25*c*.

On the other hand, when the opening operation of the lift-gate door 3 is rapidly decelerated due to some reason, the rotation of the lift-gate door 3 is interrupted, as a result, an excessive load whose level exceeds the level of the predetermined load (rated load) is applied to the driving unit 11, which is connected to the lift-gate door 3 by means of the rod 13. In such condition, in the intermediate gear 25 of the driving unit 11, a transmission of the driving force transmitted from the circular portion 25*d* to the supporting member 25*c* is interrupted by means of the leaf spring 29*c*, which is deformed as shown in FIG. 5B. Specifically, the driving force generated by the electric motor 20 is transmitted to the circular portion 25*d* by means of the clutch mechanism 21, however, because the rotation of the lift-gate door 3 is rapidly decelerated, the rotation of the supporting member 25, which is connected to the lift-gate door 3, is interrupted. Specifically, because a load applied to the supporting member 25*c* exceeds the level of the predetermined load (rated load), an excessive load whose level exceeds a load, which is corresponding to the rated load (threshold), is applied to the convex portion 29*d* of the leaf spring 29*c* by means of the protruding portions 29*a* and 29*b*. In this condition, the convex portion 29*d* of the leaf spring 29*c* is supported by the protruding portions 29*a* of the supporting member 25*c*, and the convex portion 29*d* is pressed in a rotational direction of the circular portion 25*d* by means of the protruding portions 29*b* of the circular portion 25*d* relative to a point at which the convex portion 29*d* of the leaf spring 29*c* is supported by the protruding portions 29*a* of the supporting member 25*c*. And then, the leaf spring 29*c* is significantly and elastically deformed so that the protruding portions 29*b* of the circular portion 25*d* runs upon the convex portion 29*d*. Thus, the convex portion 29*d* of the leaf spring 29*c* is disengaged from the protruding portions 29*b* of the circular portion 25*d* in a rotational direction of the intermediate gear 25, as a result, the transmission of the driving force between the circular portion 25*d* and the supporting member 25*c* is interrupted. More specifically, the driving force transmitted from the electric motor 20 and the lift-gate door 3 can be conducted or interrupted by elastically deforming the leaf spring 29*c* on the basis of the predetermined load, which is set as a threshold. In this embodiment, the protruding portions 29*b* of the circular portion 25*d* runs upon the convex portion 29*d*, however, another configuration can be applied alternatively. For example, the protruding portions 29*a* of the supporting member 25*c* may run upon the convex portion 29*d* by deforming the shapes of the protruding portions 29*a* and 29*b*.

As explained above, the driving unit 11 includes the intermediate gear 25 for transmitting a driving force generated by the electric motor 20 to the lift-gate door 3, and the intermediate gear 25 includes the leaf spring 29*c*. The driving force transmitted from the electric motor 20 to the lift-gate door 3 can be interrupted by elastically deforming the leaf spring 29*c* on the basis of the predetermined load, which is set as the threshold. Thus, when a load that exceeds the threshold of the leaf spring 29*c* is applied to the intermediate gear 25, the leaf spring 29*c* is elastically deformed so as to interrupt the transmission of the driving force from the electric motor 20 to the lift-gate door 3. In this case, the threshold of the leaf spring 29*c* is set as an upper limit of the load that can be applied to driving members such as the intermediate gear 25, pinion gear 24 and the sector gear 27. Specifically, the driving members can be designed so as to endure an excessive load that exceeds the threshold of the leaf spring 29*c*. More specifically the driving members can be designed so as to endure at least a load that equals to the threshold of the leaf spring 29*c*. Thus, reinforcements on the driving members can be minimized by setting the threshold of the leaf spring 29*c* preferably.

Further, because the torque limiter mechanism 29 is provided between the supporting member 25*c* and the circular portion 25*d* in a radial direction of the intermediate gear 25, a dimension of the intermediate gear 25 cannot be increased in an axial direction. Thus, even when a space in the driving unit 11 into which the intermediate gear 25 is mounted is limited in an axial direction of the driving unit 11, the torque limiter mechanism 29 can be provided in the intermediate gear 25.

Further, because the torque limiter mechanism 29 is provided between the supporting member 25*c* and the circular portion 25*d* in an axial direction of the intermediate gear 25, a dimension of the intermediate gear 25 cannot be increased in a radial direction. Thus, even when a space in the driving unit 11 into which the intermediate gear 25 is mounted is limited in a radial direction of the driving unit 11, the torque limiter mechanism 29 can be provided in the intermediate gear 25.

Furthermore, because the leaf spring 29*c* of the torque limiter mechanism 29 is made of an elastic member, even when the transmission of the driving force from the electric motor 20 to the lift-gate door 3 is interrupted, the leaf spring 29*c* may not be replaced on each occasion. The above mentioned driving unit 11 may be applied to a structure of other than the vehicle. For example, the driving unit 11 may be used for opening/closing a window of a building.

A second embodiment of the present invention will be explained with reference to FIG. 1 and FIG. 7. In the second embodiment, a driving unit 111 drives the electric lift-gate door unit 1 shown in FIG. 3 so as to be opened/closed.

The driving unit 111 (driving device) includes an electric motor 20 (driving source), a clutch mechanism 21, a pinion gear 24, an intermediate gear 25 (driving member), an output shaft 26 (shaft), a sector gear 27 (driven member) and an arm 12 (connector) (outer member). The clutch mechanism 21, the pinion gear 24, the intermediate gear 25, the output shaft 26, the sector gear 27 and the arm 12 are functioned as a force transmission mechanism for transmitting a driving force from the electric motor 20 to the lift-gate door 3 (rod 13). Such parts except the clutch mechanism 21 comprises an intermediate mechanism 90. An upper case 23 and a lower case 22 support the output shaft 26 so as to be rotatable, and the output shaft 26 is fitted to the sector gear 27. The sector gear 27, the intermediate gear 25 which engages with the sector gear 27 and the pinion gear 24 that engages with the intermediate gear 25 are housed in a space between the upper case 23 and the lower case 22.

The electric motor 20 (driving source) generates a driving force for actuating the lift-gate door 3 so as to be opened and closed. The driving force generated by the electric motor 20 is transmitted to the clutch mechanism 21 by means of a worm (not shown) and a worm wheel 20*a*.

As shown in FIG. 2, the clutch mechanism 21 is a known electromagnetic clutch that is comprised of a plate 21*a*, a rotor 21*b* and a magnet coil 21*c*. When a power is supplied to the magnet coil 21*c*, an attraction force is generated between the plate 21*a* and the rotor 21*b*, so that the plate 21*a* frictionally engages with the rotor 21*b* (engaging state). In the engaging state, when the worm wheel 20*a* is rotated by a driving force generated by the electric motor 20, the plate 21*a* connected to the worm wheel 20*a* is rotated in conjunction with the rotation of the worm wheel 20*a*. At this point, by means of a frictional force generated between the plate 21*a* and the rotor 21*b*, the rotor 21*b* is rotated in conjunction with the plate 21*a*. Further, the rotor 21*b* is connected to the output shaft 31 so as to be concurrently rotatable. Specifically, when the driving unit 11 is actuated, the clutch mechanism 21 becomes in an engaging state, and then the driving force generated by the electric motor 20 is transmitted to the output shaft 31 by means of the clutch mechanism 21.

The pinion gear 24 is connected to the output shaft 31, which is inserted into a through hole 22*a* of the lower case 22, so as to be rotated concurrently. Specifically, a through hole 24*a*, which penetrates in an axial direction of the pinion gear 24, is formed on the pinion gear 24, and a serration 24*b*, which meshes with a serration 31*a* of the output shaft 31, is formed on an inner peripheral surface of the through hole 24*a*. Thus, in circumstances where the serration 24*a* of the pinion gear 24 is engaged with the serration 31*a* of the output shaft 31, the pinion gear 24 is rotated together with the output shaft 31.

A shaft portion 22*b* of the lower case 22 is inserted into the intermediate gear 25 (driving member) in order to rotatably support the intermediate gear 25. The intermediate gear 25 includes a first gear portion 25*a* whose diameter is larger than a diameter of the pinion gear 24, and a second gear portion 25*b* whose diameter is smaller than the diameter of the first gear portion 25*a*. The first gear portion 25*a* meshes with the pinion gear 24 so that the intermediate gear 25 is rotated by a driving force generated by the electric motor 20.

The output shaft 26 is formed in a column-shape having plural diameters so as to be in a stepped shape in a side view. The output shaft 26 is rotatably supported by the lower case 22 in circumstances where a first shaft portion 26*a* formed on a base end side of the output shaft 26 is inserted into a bearing hole 22*c* formed on the lower case 22 so as to be rotatably supported by the lower case 22. Specifically, the output shaft 26 includes a first serration shaft portion 26*b*, a second shaft portion 26*c*, a second serration shaft portion 26*d* and a screw portion 26*e* in a sequential order, and a diameter of the second shaft portion 26*c* is smaller than a diameter of the first serration shaft portion 26*b*, and a diameter of the second serration shaft portion 26*d* is smaller than the diameter of the second shaft portion 26*c* and a diameter of the screw portion 26*e* is smaller than the diameter of the second serration shaft portion 26*d*, and thus, diameters of the output shaft 26 are gradually decreased toward a top end side thereof. The first serration shaft portion 26*b* is fitted into a through hole 27*a* of the sector gear 27, and the second serration shaft portion 26*d* is fitted into a sleeve 12*a* fixed to the arm 12.

The sector gear 27 is formed in a sector shape, and the output shaft 26 is fit into the through hole 27*a* of the sector gear 27 so that the sector gear 27 can rotate together with the output shaft 26. Specifically, the through hole 27*a* penetrating in an axial direction is formed on the sector gear 27, and on an inner peripheral surface of the through hole 27*a*, a serration 27*b* is formed. The serration 27*b* corresponds to the serration of the first serration shaft portion 26*b*. Thus, the sector gear 27 is rotated together with the output shaft 26 in circumstances where the serration 27*b* of the sector gear 27 is fitted to the serration of the first serration shaft portion 26*b*. Further, the sector gear 27 also meshes with the second gear portion 25*b* of the intermediate gear 25, and thus the sector gear 27 can be rotated along with the output shaft 26 by the intermediate gear 25.

Figure 7:
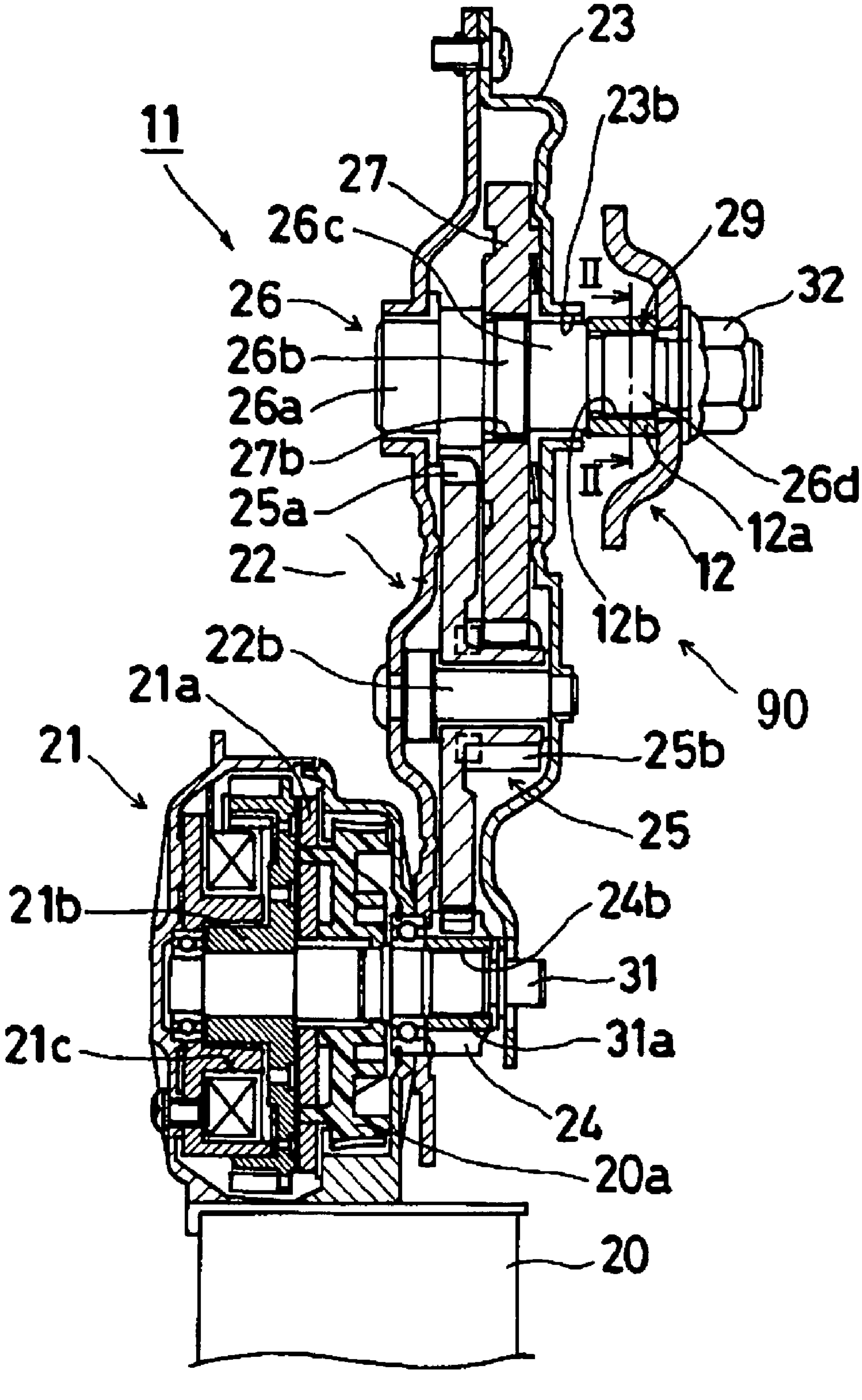
FIG. 7 illustrates a partial cross section of the driving unit according to the second embodiment including the structure shown in FIG. 1.

As shown in FIG. 7, the arm 12 is connected to the second serration shaft portion 26*d* of the output shaft 26, which is inserted into a bearing hole 23*b* of the upper case 23 and extending rightward in FIG. 7, so as to be rotated together with the output shaft 26. Specifically, the sleeve 12*a* corresponding to the output shaft 26 (second serration shaft portion 26*d*) is fixed to a base end of the arm 12 so as to be extending in an axial direction. On an inner peripheral surface of the sleeve 12*a*, a serration 12*b* is formed so as to correspond to the serration of the second serration shaft portion 26*d*. Thus, the serration 12*b* of the arm 12 meshes with the serration of the output shaft 26 (second serration shaft portion 26*d*) so that the arm 12 rotates together with the output shaft 26. Further, in circumstances where the output shaft 26 is inserted into a hole of the arm 12 so as to be extending in rightward in FIG. 2, a nut 32 is screwed to the screw portion 26*e*, which is formed on the top end of the output shaft 26.

Figure 8A:
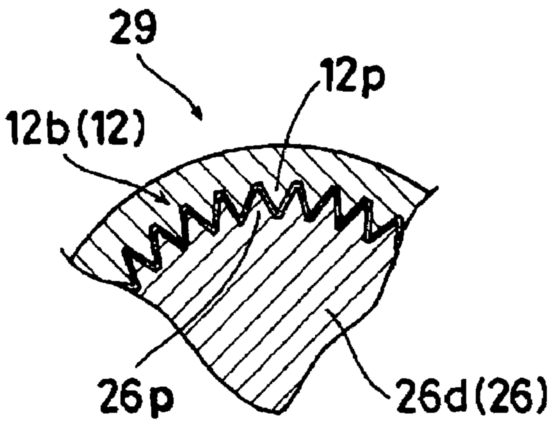
FIG. 8A illustrate a cross sectional view of, taken along line II—II in FIG. 7, a torque limiter mechanism which is not in active and which is employed in the driving unit shown in FIG. 7.

A torque limiter mechanism 129 is provided at the intermediate gear 25. A structure and a configuration of the torque limiter mechanism 129 will be explained in reference with FIG. 8A. FIG. 8A illustrates a cross section of FIG. 7 along a II—II line.

A torque limiter mechanism 129 is provided between the serration 12*b* of the arm 12 and the second serration shaft portion 26*d* of the output shaft 26. A structure and a configuration of the torque limiter mechanism 129 will be explained with reference to FIG. 8A. FIG. 8A illustrates a cross section along a II—II line of the torque limiter mechanism 129 illustrates in FIG. 7.

The torque limiter mechanism 129 includes plural protruding portions 26*p*, which is formed on the second serration shaft portion 26*d* of the output shaft 26, and plural protruding portions 12*p*, which is formed on the serration portion 12*b* of the arm 12. The protruding portions 26*p* are extending in an axial direction of the output shaft 26 and the protruding portions 12*p* (load regulator) are extending in an axial direction of the arm 12, and the protruding portions 26*p* are engaged with the protruding portions 12*p*. The driving force generated by the electric motor 20 is transmitted to the arm 12 so that the protruding portions 26*p* of the output shaft 26 presses the protruding portions 12*p* of the arm 12, as a result, the arm 12 is rotated. At this point, the protruding portions 12*p* of the arm 12 and the protruding portions 26*p* of the output shaft 26 are applying loads to each other. Specifically, when the driving force generated by the electric motor 20 is transmitted to the arm 12 by means of the output shaft 26, a load is applied to the protruding portions 12*p* of the arm 12 from the protruding portions 26*p* of the output shaft 26. In this case, the more the level of the driving force which is transmitted from the output shaft 26 to the arm 12 becomes large, the more the level of the load, which is required for pressing and moving the protruding portions 12*p* of the arm 12 by the protruding portions 26*p*, becomes large, as a result, a reaction force, specifically a load applied to the protruding portions 12*p*, becomes large. In the second embodiment, the strength of the arm 12 is set at a level at which the protruding portions 12*p* can be broken or deformed when a load applied to the protruding portions 12*p* exceeds a predetermined value (threshold). The strength of the arm 12 can be obtained by preferably selecting a material of the arm 12 or the output shaft 26 that has a preferable hardness.

In the above explanation, when the driving force transmitted between the output shaft 26 and the arm 12 exceeds a predetermined value, the protruding portions 12*p* of the arm 12 are broken, however, the protruding portions 26*p* (load regulator) of the output shaft 26 may be broken alternatively.

Further, the shape of the protruding portions 12*p* of the arm 12 is not limited to the shape explained in the second embodiment. The protruding portions 12*p* may be formed in another shape if they can be preferable broken when the load applied thereto exceeds the predetermined value (threshold).

Figure 9:
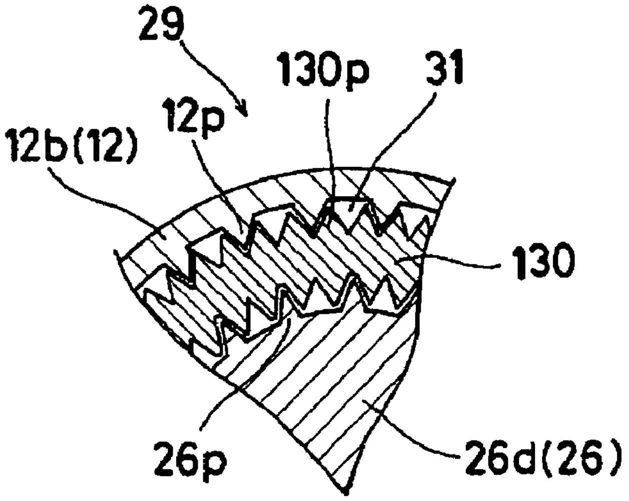
FIG. 9 illustrates a modified example of the torque limiter mechanism shown in FIG. 8A.
Figure 10:
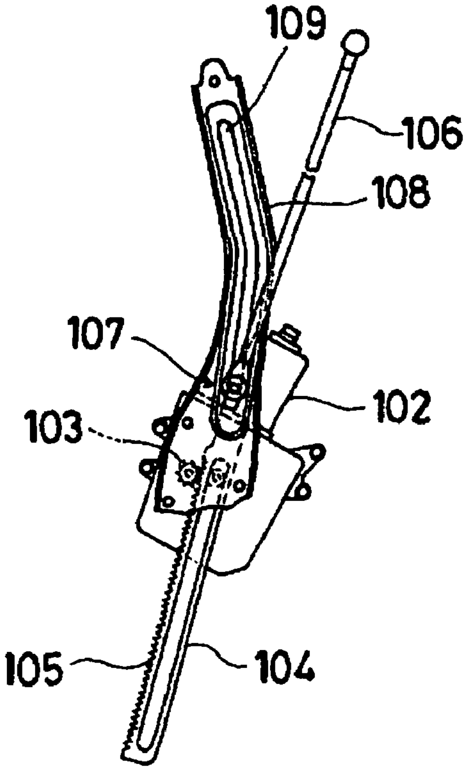
FIG. 10 illustrates a diagram indicating a structure of a known driving device and FIG. 11 illustrates a schematic view indicating an example in which the known driving device shown in FIG. 10 is applied to an electrically operated lift-gate door unit of a vehicle.
Figure 11:
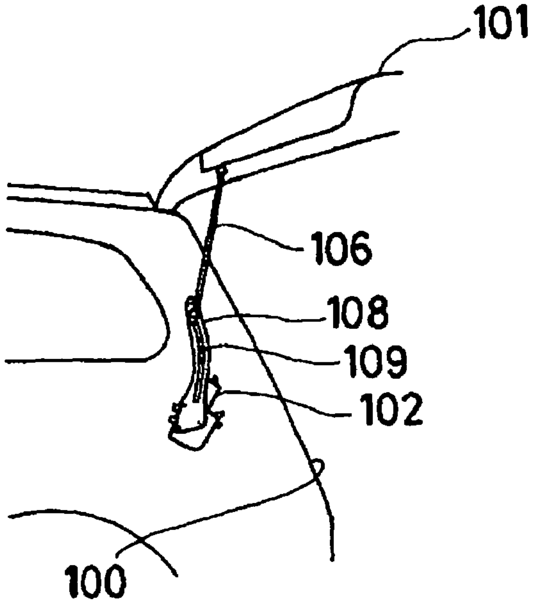

The driving force generated by the electric motor 20 is transmitted by means of the protruding portions 12*p* and 26*p* of the torque limiter mechanism 129, however, the driving force can be transmitted by means of a ring member 130 (load regulator) (connector) (inner member) which is provided between the protruding portions 26*p* of the output shaft 26 and the protruding portions 12*p* of the arm 12 as shown in FIG. 9. A material of the ring member 130 can be selected preferably so that the protruding portions 130*p* of the ring member 130 can be broken when the driving force transmitted between the output shaft 26 and the arm 12 exceeds a predetermined value. It is preferable that a space 31 is provided for housing the broken protruding portions 130*p* between the ring member 130 and the output shaft 26 (second serration shaft portion 26*d*), or between the ring member 130 and the arm 12 (serration portion 12*b*). Thus, it can be prevented that the broken protruding portions 130*p* is engaged with the body of the ring member 130, as a result, the transmission of the driving force between the output shaft 26 and the arm 12 can be certainly interrupted.

In this example the torque limiter mechanism 129 is provided between the output shaft 26 and the arm 12, however, the torque limiter mechanism 129 may be provided between the output shaft 26 and the sector gear 27 (driving member).

Figure 8B:
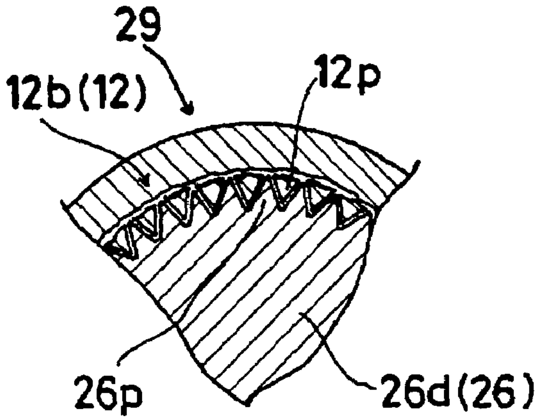
FIG. 8B illustrate a cross section of the torque limiter mechanism which is in active.

An actuation of the torque limiter mechanism 129 when the lift-gate door 3 is opened will be explained with reference to FIG. 3, FIG. 7, FIG. 8A and FIG. 8B. FIG. 8A illustrates a condition of the torque limiter mechanism 129 when the lift-gate door 3 is normally opened, and FIG. 8B illustrates a condition of the torque limiter mechanism 129 when the opening operation of the lift-gate door 3 is rapidly decelerated.

When the lift-gate door 3 is in a closed state as shown in a solid line in FIG. 3, a power is supplied to the electric motor 20 in order to actuate the driving unit 11. Specifically, a driving force is generated by the electric motor 20, and such driving force is transmitted to the output shaft 31 in order to rotate the output shaft 31 is rotated. Such driving force is further transmitted to the arm 12 through the pinion gear 24, the intermediate gear 25 (the first gear portion 25*a* and the second gear portion 25*b*), the sector gear 27 and the output shaft 26, and further transmitted by means of the rod 13 to the lift-gate door 3. Finally, the lift-gate door 3 is actuated so as to be opened as shown in the chain double-dashed line in FIG. 3.

When the lift-gate door 3 is normally opened, because the movement of the lift-gate door 3 is not interrupted, a predetermined load (rated load) is applied to the driving unit 111, which is connected to the lift-gate door 3 by means of the rod 13. In this circumstance, a driving force is transmitted from the output shaft 26 to the arm 12 by means of the protruding portions 26*p* of the torque limiter mechanism 129 as shown in FIG. 8 A. Specifically, such driving force transmitted to the output shaft 26 is further transmitted to arm 12 by means of the protruding portions 26*p* pressing and moving the protruding portions 12*p* of the arm 12. When the driving force generated by the electric motor 20 is transmitted from the output shaft 26 to the arm 12, a load whose level is corresponding to the rated load is transmitted from the protruding portions 26*p* of the output shaft 26 to the protruding portions 12*p* of the arm 12.

On the other hand, when the opening operation of the lift-gate door 3 is rapidly decelerated due to some reason, the rotation of the lift-gate door 3 is interrupted, as a result, an excessive load whose level exceeds the level of the predetermined load (rated load) is applied to the driving unit 111, which is connected to the lift-gate door 3 by means of the rod 13. In such condition, a transmission of the driving force transmitted from the output shaft 26 to the arm 12 is interrupted by means of the protruding portions 12*p* of the torque limiter mechanism 129 so as to be broken as shown in FIG. 8B. Specifically, the driving force generated by the electric motor 20 is transmitted to the output shaft 26 by means of the clutch mechanism 21, however, because the rotation of the lift-gate door 3 is rapidly decelerated, the rotation of the arm 12, which is connected to the lift-gate door 3, is interrupted. In this case, because the protruding portions 26*p* of the output shaft 26 presses and moves the protruding portions 12*p* of the arm 12, whose rotation is interrupted, an excessive load is applied from the protruding portions 26*p* of the output shaft 26 to the protruding portions 12*p* of the arm 12. Specifically, when the level of the driving force, which is transmitted from the output shaft 26 and the arm 12, exceeds a predetermined value, an excessive load whose level exceeds a load, which is corresponding to the rated load (threshold), is applied from the protruding portions 26 of the output shaft 26 to the protruding portions 12*p* of the arm 12. Thus, the protruding portions 12*p* of the arm 12 is broken so as to interrupt the transmission of the driving force from the output shaft 26 to the arm 12. Specifically, the transmission of the driving force from the electric motor 20 to the lift-gate door 3 is interrupted by means of the protruding portions 12*p* which is irreversibly deformed on the basis of the predetermined load, which is set as the threshold.

As explained above, according to the driving unit 111 of the second embodiment, the arm 12 that transmits the driving force generated by the electric motor 20 includes a protruding portions 12*p*. The transmission of the driving force between electric motor 20 and the lift-gate door 3 can be interrupted by irreversibly deforming the protruding portions 12*p* on a basis of the threshold that is set by the predetermined load. Thus, when an excessive load that exceeds the threshold of the protruding portions 12*p* is applied to the arm 12, the protruding portions 12*p* is irreversibly deformed so as to interrupt the driving force transmitted between the electric motor 20 and the lift-gate door 3. In this case, the threshold of the protruding portions 12*p* is set as an upper limit of the load that can be applied to driving members such as the arm 12, the intermediate gear 25 and the sector gear 27. Specifically, the driving members can be designed so as to endure an excessive load that exceeds the threshold of the protruding portions 12*p*. More specifically the driving members can be designed so as to endure at least a load that equals to the threshold of the protruding portions 12*p*. Thus, reinforcements of the driving members can be minimized by setting the threshold of the protruding portions 12*p* preferably.

The ring member 130 is provided between the output shaft 26 and the arm 12. In this configuration, the transmission of the driving force between the output shaft 26 and the arm 12 is interrupted by breaking the ring member 130. Thus, when the driving unit 111 needs to be fixed, only the ring member 130 can be replaced, and there is no need to replace the driving members such as the output shaft 26 and the arm 12. The driving unit 111 may be applied to a structure of other than the vehicle. For example, the driving unit 111 may be used for opening/closing a window of a building.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A driving device for driving an open/close member that is designed to open and close an open portion of a body comprising:
- a driving source generating a driving force;
- a force transmission mechanism disposed between the driving source and the open/close member and serving for transmitting the driving force thereto; and
- a load regulator for interrupting the driving force transmission when an excessive force is applied to the force transmission mechanism from the open/close member;
- wherein the force transmission mechanism includes a clutch mechanism, which is connected to the driving source, and an intermediate mechanism, which is connected to the open/close member, the intermediate mechanism being provided with the load regulator;
- wherein the intermediate mechanism has a driving member, which is connected to the clutch mechanism, and a driven member, which is connected to the open/close member, and the load regulator is provided between the driving member and the driven member, the load regulator being expected to be deformed, upon receipt of the excessive force, in order to interrupt the driving force transmission from the driving member to the driven member; and
- wherein opposed gear surfaces are provided on the respective driving member and the driven member, and the load regulator including a ring member is made of a corrugated metal plate.

2. A driving device as set forth in claim 1, the load regulator is returned to its original shape upon release of the excessive force.

3. A driving device as set forth in claim 1, wherein the geared surfaces of the respective driving member and the driven member are opposed with each other in a radial direction.

4. A driving device as set forth in claim 3, wherein the geared surfaces of the respective driving member and the driven member are opposed with each other in an axial direction.

5. A driving device as set forth in claim 1, wherein the ring member is a ring-shaped leaf spring made of a corrugated metal sheet.

* * * * *